Patented Feb. 2, 1943

2,309,932

UNITED STATES PATENT OFFICE 2,309,932

RUBBER HYDROCHLORIDE COMPOSITION

James P. Chittum and George E. Hulse, Passaic, N. J., assignors to United States Rubber Company, New York, N. Y., a corporation of New Jersey No Drawing. Application January 24, 1940, Serial No. 315,327

9 Claims. (Cl. 260—735)

This invention relates to new compositions of matter comprising rubber-hydrogen chloride reaction products, particularly to transparent films and lacquers.

An object of the invention is to provide a new class of photochemical inhibitors for rubber hydrochloride films, particularly for transparent rubber hydrochloride films. Other objects will be apparent from the following description.

Hitherto the effectiveness of chemical stabilizers of rubber hydrochloride has been limited by their lack of solubility in the film, their volatility from the film, or discoloration of the film on aging.

The present invention provides chemicals which are compatible with rubber hydrochloride and which enable the production of films which are clear and free from haze or color and which do not discolor during light aging. The chemicals furthermore do not impart any odor to the films, which makes their use as wrappers for food materials desirable. Compared with other chemicals previously used for the purpose the films of the present invention retain their usefulness longer because of better retention of strength and flexibility.

Broadly the invention comprises the use, as chemical stabilizers in rubber hydrochloride compositions, of N,N'-diaryl piperazine which has the general formula

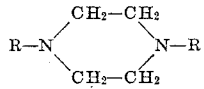

where R represents an aryl group. Examples of aryl groups included within the scope of the invention are phenyl, tolyl, naphthyl, xenyl, etc.

Examples of such chemicals included within the scope of the invention are: N,N'-diphenyl piperazine, N,N'-di-p-tolyl piperazine, N,N'-di-o-tolyl piperazine, N,N'-di-beta-naphthyl piperazine, N,N'-di-alpha-naphthyl piperazine, N,N'-dixenyl piperazine, etc.

The rubber hydrochloride may be produced by passing hydrogen chloride gas into a rubber cement, as disclosed by Bradley and McGavack (U. S. Patent 1,519,659), or by reacting rubber with hydrogen chloride gas as a low temperature (disclosed by Gebauer-Fullnegg and Moffet U. S. Patent 1,980,396) or by any other method.

If the rubber hydrochloride is sufficiently soluble it can be made into a cement to which a diaryl piperazine is added in such amount as has been determined by experiment to give effective protection against light ageing. The cement may then be cast into film or used as a lacquer.

Some products of rubber and hydrogen chloride are not sufficiently soluble to form spreading cements. The diaryl piperazine stabilizers may be incorporated into such rubber hydrochlorides by milling on a rubber mill. Films can then be produced by calendering the mixture.

Rubber hydrochloride films having incorporated therein an N,N'-diaryl piperazine in accordance with the invention have been found to be more resistant to deterioration upon exposure to light than films containing no added stabilizer.

The following table illustrates the improvements in aging obtained by incorporating 2% by weight of an N,N'-diaryl piperazine in transparent films of rubber hydrochloride:

| Stabilizer | Fadeometer | Sunlamp | Diffused light |
|---|---|---|---|
| | Hours | Hours | Days |
| None | 35 | 182 | 42 |
| Diphenyl piperazine | 47 | 198 | 69 |

The films (thickness .001 inch) were respectively aged until brittle in a standard Fadeometer at 110° F., under a standard G. E. sunlamp, and in daylight behind a window having a southern exposure.

The diaryl piperazines may be prepared by known methods, such as by condensation of two moles of a primary mono-arylamine with two moles of ethylene dihalide. (Berichte 22 1778; Jahresberichte (1858) 352).

The new stabilizers may be used with rubber hydrochlorides having any hydrogen chloride content in the range commercially available, and especially with rubber hydrochloride having a hydrogen chloride content of over 30% and being in the form of transparent film suitable for photographic film or for wrapping purposes.

The rubber hydrochloride stabilized by the chemicals disclosed herein may be used in various forms and for the various purposes for which rubber hydrochloride compositions are generally known to be used.

Having thus described our invention, what we claim and desire to protect by Letters Patent is:

1. A rubber hydrochloride composition containing an N,N'-diaryl piperazine, wherein the aryl groups are selected from the class consisting of the benzene, and naphthalene series, in a small amount sufficient to retard the photochemical disintegration of the rubber hydrochloride.

2. A rubber hydrochloride composition containing a diaryl piperazine having the general formula

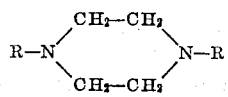

where R represents an aryl group selected from the class consisting of the benzene, and naphthalene series, in a small amount sufficient to retard the photochemical disintegration of the rubber hydrochloride.

3. A pellicle comprising a rubber hydrochloride composition containing an N,N'-diaryl piperazine, wherein the aryl groups are selected from the class consisting of the benzene, and naphthalene series, in a small amount sufficient to retard the photochemical disintegration of the rubber hydrochloride.

4. A transparent pellicle comprising a rubber hydrochloride composition containing an N,N'-diaryl piperazine, wherein the aryl groups are selected from the class consisting of the benzene, and naphthalene series, in a small amount sufficient to retard the photochemical disintegration of the rubber hydrochloride.

5. A rubber hydrochloride composition containing a small quantity of an N,N'-diaryl piperazine of the benzene series which is sufficient to retard the photochemical disintegration of the rubber hydrochloride.

6. A rubber hydrochloride composition containing a small amount of N,N'-diphenyl piperazine which is sufficient to retard the photochemical disintegration of the rubber hydrochloride.

7. A rubber hydrochloride composition containing a small amount of N,N'-di-p-tolyl piperazine which is sufficient to retard the photochemical disintegration of the rubber hydrochloride.

8. A rubber hydrochloride composition containing a small amount of N,N'-di-beta-naphthyl piperazine which is sufficient to retard the photochemical disintegration of the rubber hydrochloride.

9. A product composed at least in part of rubber hydrochloride stabilized with an N,N'-diaryl piperazine, wherein the aryl groups are selected from the class consisting of the benzene, and naphthalene series, in a small amount sufficient to retard the photochemical disintegration of the rubber hydrochloride.

JAMES P. CHITTUM.
GEORGE E. HULSE.